United States Patent
Kume et al.

[11] Patent Number: 5,948,039
[45] Date of Patent: Sep. 7, 1999

[54] VEHICULAR NAVIGATION DISPLAY SYSTEM

[75] Inventors: Akihiro Kume; Daisuke Katou, both of Anjo, Japan

[73] Assignee: Aisin AW Co., Ltd., Japan

[21] Appl. No.: 08/824,404

[22] Filed: Mar. 26, 1997

[30] Foreign Application Priority Data

Apr. 26, 1996 [JP] Japan .................................... 8-107084

[51] Int. Cl.⁶ .................................................. G06F 165/00
[52] U.S. Cl. .......................... 701/200; 701/208; 340/990; 340/995
[58] Field of Search ........................... 301/200, 207, 301/208, 211; 73/178 R; 340/988, 990, 995

[56] References Cited

U.S. PATENT DOCUMENTS

| 4,689,747 | 8/1987 | Kurose et al. | 701/208 |
| 4,757,455 | 7/1988 | Tsunoda et al. | 701/208 |
| 4,903,211 | 2/1990 | Ando | 701/208 |
| 4,912,645 | 3/1990 | Kakihara et al. | 701/208 |

*Primary Examiner*—Gary Chin
*Attorney, Agent, or Firm*—Lorusso & Loud

[57] ABSTRACT

A vehicular navigation system includes first and second clocks CLK1 and CLK2 which can be switched to operate either a 320 dot per horizontal line display (aspect ratio=4:3) or a 400 dot per horizontal line display (aspect ratio=16:9). The clock switching is under the control of software writing to a control register 23 which in turn controls switching in an image data memory control unit 24 and a display control unit 34 to process or handle lines of either 320 or 400 pixels.

4 Claims, 7 Drawing Sheets

VEHICULAR NAVIGATION DISPLAY SYSTEM

BACKGROUND OF THE INVENTION

1. Field of the Invention

The present invention relates to a vehicular navigation display system.

2. Related Art

In prior art vehicular navigation systems using a display with 320 pixels per horizontal line, the pixels are read out and displayed by timing in accordance with a clock suitable for producing the 320 pixels.

Figure 7:
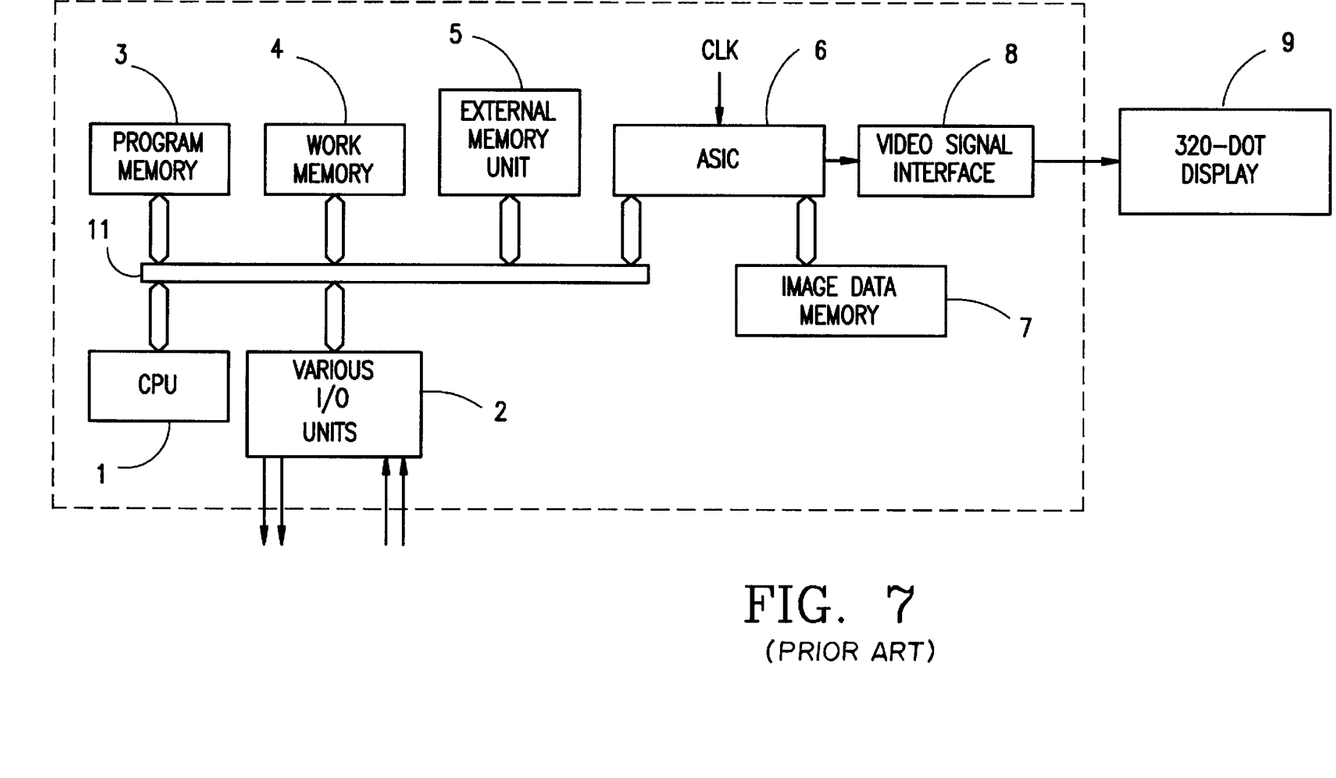
FIG. 7 is a block diagram of a prior art vehicular navigation system.

As shown in FIG. 7, an electronic control unit (ECU) for a prior art vehicular navigation system includes a central processing unit (CPU) 1, various input/output (I/O) units 2, a program memory 3, a work memory 4, an external memory unit 5, an application-specified IC (ASIC) 6, an image data memory 7, a video signal interface 8 and a display 9 with a horizontal width of 320 dots or pixels. Numeral 11 designates a system bus.

From data read out of the external memory unit 5, the CPU 1 produces suitable image data for the display screen 9 and writes the image data in the image data memory 7 through the ASIC 6. The ASIC reads out horizontal lines of the image data in the memory 7 and converts the data to RGB video signals. These RGB video signals along with horizontal and vertical sync signals generated by the ASIC are applied to the display 9 to display a plurality of 320 pixel (dot) horizontal lines. This prior art display 9 has an aspect ratio of 4:3 (horizontal:vertical).

Figure 8:
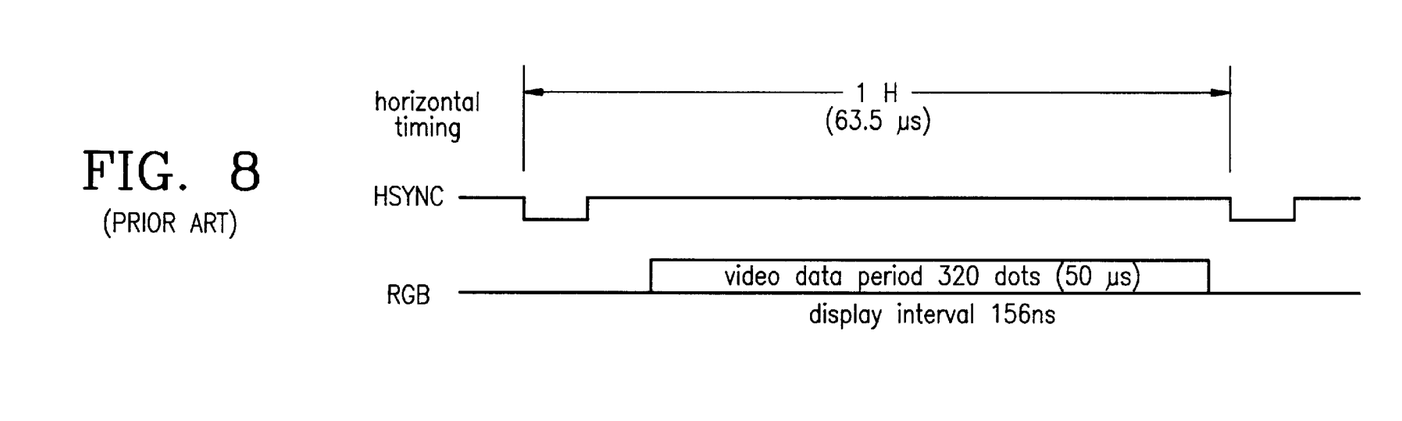
FIG. 8 is a timing chart of horizontal sync and video signals generated by the prior art to operate a 320 dot per horizontal line display.

The clock driving the ASIC is suitable for the 320 horizontal dot display. As illustrated in FIG. 8, the period between horizontal synchronizing signals is 63.5 $\mu s$ and the RGB video data portion (320 dots) of this period is 50 $\mu s$ in duration. In this example, each dot interval is 156 ns ($\frac{1}{320}$ of 50 $\mu s$) requiring a display rate of 6.4 MHz. The clock driving the ASIC has a frequency four times higher than the display rate or 25.6 MHz.

Recently, some navigation systems have been designed to utilize a display with a wider aspect ratio of 16:9 (horizontal:vertical). This wider aspect display screen has 400 dots or pixels per horizontal line. Although the period between horizontal synchronizing signals and the period in each horizontal line for RGB data remain the same, the clock frequency is increased to read and display 400 dots per horizontal line.

In the prior art, different electronic control units (ECUs) are required for the 320 horizontal dot and 400 horizontal dot displays. This results in higher costs since manufacturing separate ECUs for the corresponding 320 horizontal dot and 400 horizontal dot displays costs more than manufacturing a single ECU.

SUMMARY OF THE INVENTION

An object of the present invention is to solve the above-specified problem and to provide a vehicular navigation system which can display data properly without changing the hardware even if it is connected with a display having a different number of dots per horizontal line.

In order to achieve the above-specified object according to the present invention, a vehicular navigation system includes at least two clocks corresponding to two different numbers of dots in horizontal lines of different displays. A display operation control unit selects the horizontal line dot number of the display unit from the two different horizontal line dot numbers. A synchronous control unit is responsive to the display control unit for switching to the clock corresponding to the selected horizontal line dot number. An image data memory control unit writes image data in an image data memory in response to an instruction from a CPU and reads lines of the image data from the image data memory in accordance with the selected horizontal line dot number. A line buffer receives a line of image data read from the image data memory. A display unit is responsive to the switched clock for reading the image data from the line buffer and producing corresponding video signals operating the display.

In a specific example, a vehicular navigation system has two clocks suitable for different displays one with an aspect ratio of 4:3 with 320 dots in each horizontal line and another with an aspect ratio of 16:9 with 400 dots in each in each horizontal line.

An application-specified IC (ASIC) has a control register responding to an instruction from the CPU to select either a first clock corresponding to the aspect ratio of 4:3 or a second clock corresponding to the aspect ratio of 16:9.

Also the ASIC includes an image data memory control unit and a line buffer which are switched to process image data of either 320 dots per horizontal line or 400 dots per horizontal line.

Switching in the ASIC to select the clock frequency and the horizontal line pixel length can be performed by software control so that the same hardware can be used with either a display of the 4:3 aspect ratio or a display of the 16:9 aspect ratio.

Further the clock and size of line image data can be switched in the ASIC at a time which does not affect the system by considering the display control state.

According to the present invention, the clock for the display with the 400 dot horizontal line is added to the unit with the clock for the 320 dot horizontal line, and the switching is made in the ASIC to connect either of the 320-dot or 400-dot clocks in accordance with the display connected to the unit.

By thus adding the clock for the 400 dot per horizontal line display to an ASIC for 320 dot per horizontal line display, the hardware can be used with either a 400 dot per horizontal line display or a 320 dot per horizontal line display.

The selection of the appropriate clock is performed by the CPU writing a control instruction in the control register of the ASIC so that the system is enabled to use either the 320 dot per horizontal line display or the 400 dot per horizontal line display simply by changing the software.

Since the clocks are switched in the ASIC, the clocks can be switched when the state of the display is considered and at a time which does not affect the display.

DESCRIPTION OF THE PREFERRED EMBODIMENT

An embodiment of the present invention is described with reference to the accompanying drawings.

Figure 2:
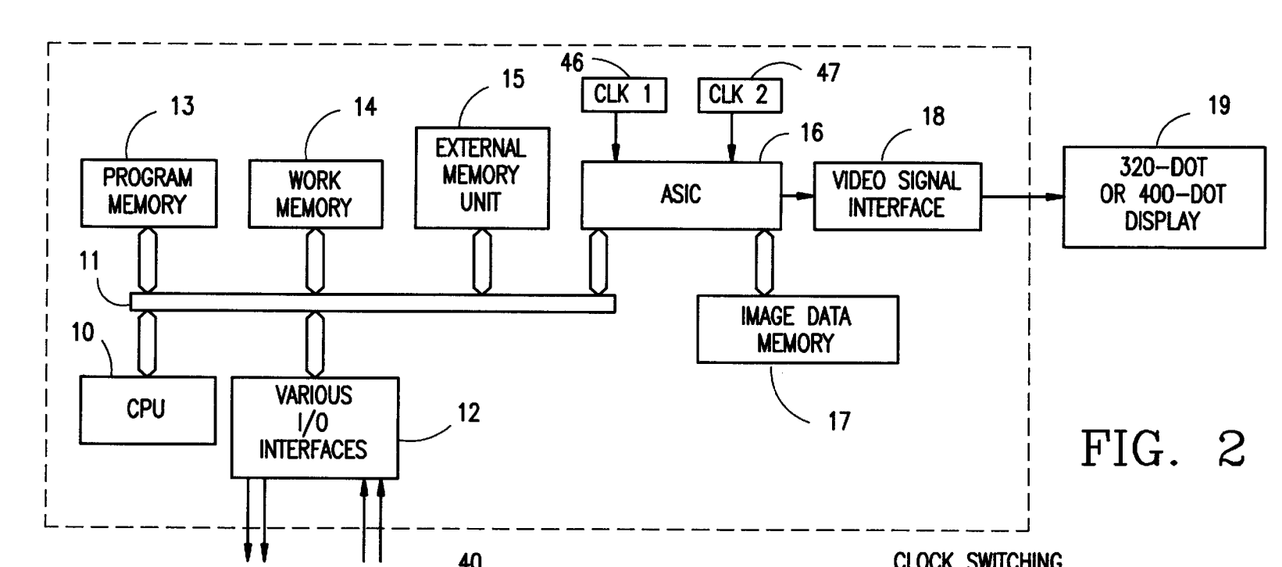
FIG. 2 is a block diagram of a vehicular navigation system employing the ASIC of FIG. 1.

As shown in FIG. 2, a vehicular navigation system constructed in accordance with the present invention includes a CPU 10, a system bus 11, various I/O interfaces 12, a program memory 14, an external memory unit 15, an ASIC 16, an image data memory 17, a video signal interface 18, and a 320 or 400 dot per horizontal line display 19 and clocks 46 and 47.

Figure 1:
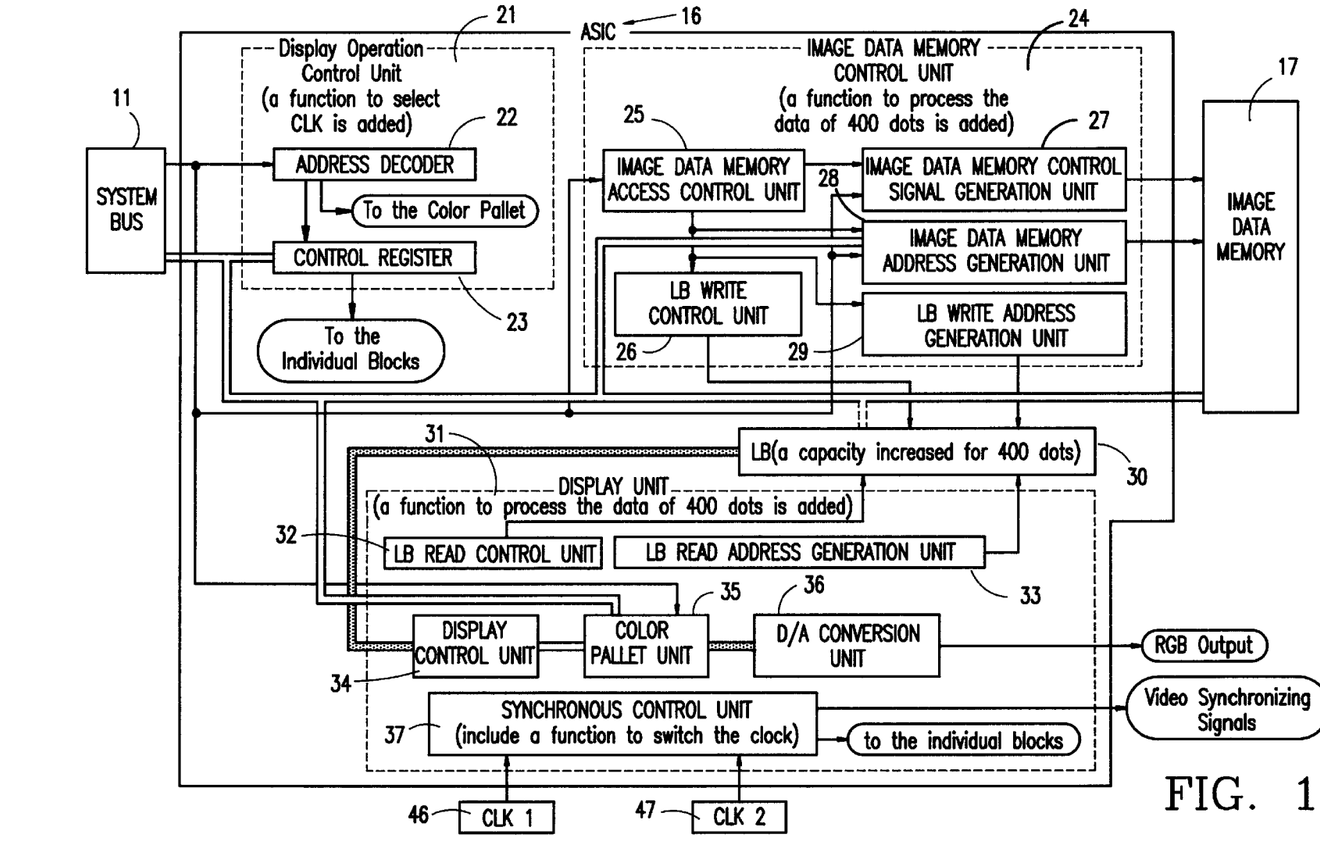
FIG. 1 is a block diagram showing an application-specified IC (ASIC) of a vehicular navigation system according to one embodiment of the present invention.

The ASIC 16 receives information from the system bus 11 and is connected with the image data memory 17 and the video signal interface 18. As shown in FIG. 1, the ASIC 16 is constructed to include a display operation control unit 21, an image data memory control unit 24, a line buffer (LB) 30 having a capacity increased from a prior art capacity for line image data of 320 dots to a capacity for line image data of 400 dots, and a display unit 31. The display operation control unit 21 operates to select a first clock CLK1 or a second clock CLK2.

The display operation control unit 21 includes an address decoder 22 and a control register 23. The image data memory control unit 24 is able to process and control 400 dot per horizontal line data in addition to 320 dot per horizontal line data and includes an image data memory access control unit 25, a line buffer (LB) write control unit 26, an image data memory control signal generation unit 27, an image data memory address generation unit 28 and a line buffer write address generation unit 29.

The display unit 31 includes a line buffer (LB) read control unit 32, a line buffer read address generation unit 33, a display control unit 34, a color pallet unit 35, a D/A conversion unit 36, and a synchronous control unit 37 for switching clocks. RGB video signals are output from the D/A conversion unit 36 through the video signal interface 18 to the 320-dot or 400-dot display 19. The selected clock CLK1 or CLK2 is input to the synchronous control unit 37 which outputs video synchronizing signals through the video signal interface 18 to the 320-dot or 400-dot display 19 as well as various clock signals to the units or blocks in the ASIC 16.

The CPU 10, under control of the program memory 13, plots or creates an image using the work memory 14 and data from the external memory unit 15 and transfers image data through the data bus 11 and ASIC to the image data memory 17. Then, the CPU sets the color pallet unit 35 and the control register 23 and starts the ASIC to begin the display.

After starting the ASIC, the image data memory access control unit 25 of the ASIC 16 outputs a request signal to the CPU 10 requesting access to the image data memory 17. When an authorization signal is received from the CPU 10, the image data memory access control unit 25 outputs a read instruction to the image data memory control signal generation unit 27 and the image data memory address generation unit 28. Meanwhile in order to write the read data in the line buffer LB 30, the image data memory access control unit 25 outputs a write instruction to the LB write control unit 26 and the LB write address generation unit 29. Then, the data of one line (image data for 320 or 400 dots) from the image data memory 17 is transferred at high speed into the line buffer 30.

In accordance with a signal from the control register 23, the display unit 31 reads out the data, as written in the line buffer 30, by the LB read control unit 32 and the LB read address generation unit 33, and latches the data in the display control unit 34. This display control unit 34 processes or scrolls the data for each dot into suitable form for the color pallet unit 35 and then transfers the processed data to the color pallet unit 35. The color pallet unit 35 expands the data in a color pallet and outputs digital RGB data streams. These digital RGB data streams are converted into analog RGB video signals by the D/A conversion unit 36 and output to the display 19.

The operations in the ASIC 16 are controlled by the various synchronizing signals and clocks which are prepared from the selected clock input (CLK1 or CLK2) to the synchronous control unit 37. The output frequency of the data from the color pallet unit 35 and the conversion frequency of the D/A conversion unit 36 are equal to the frequency of the display interval of the 320-dot or 400-dot display 19.

In operation of the ASIC 16, the address decoder 22 controls the read/write of the control register 23 and the color pallet in accordance with the addresses and control signals from the CPU 10. The control register 23 receives the instructions for display control from the CPU 10 and transmits the necessary information to the individual units.

The image data memory access control unit 25 provides control of various image memory accesses including (1) plotting image data (read/write) by CPU; (2) reading the image data for output to the display operation; and (3) refreshing the memory. This control is provided in accordance with the settings of the control register 23 and the signals from the system bus 11. The image data memory access control unit 25 controls the arbitration, start and end of the aforementioned accesses and outputs control signals to other units of the image data memory control unit 24. The image data memory access control unit 25 also controls the data bus.

In accordance with the signals from the image data memory access control unit 25 and the settings of the control register 23, the image data memory control signal generation unit 27 outputs control signals, such as read, write, RAS, CAS signals, to the image data memory 17 in response to the signal from the system bus 11.

In accordance with the signals from the image data memory access control unit 25 and the settings of the control register 23, the image data memory address generation unit 28 generates addresses at the image data memory accessing time in response to the signal from the system bus 11.

In accordance with the signals from the image data memory access control unit 25 and the settings of the control register 23, the LB write control unit 26 reads out the data for the displaying operation from the image data memory 17, and outputs control signals to the LB (line buffer) 30 for the writing operation.

In accordance with the signals from the image data memory access control unit 25 and the settings of the control register 23, the LB write address generation unit 29 generates the write addresses of the line buffer 30.

The line buffer 30 is a buffer for temporarily storing or latching the data of one line for the displaying operation, as read out from the image data memory 17, and the writing operation is performed by the image data memory control unit 24 whereas the reading operation is performed by the display unit 31.

In accordance with the settings of the control register 23, the LB read control unit 32 outputs control signals for the displaying operation at the line buffer reading time.

In accordance with the settings of the control register 23, the LB read address generation unit 33 generates addresses for the displaying operation at the LB reading time.

In accordance with the settings of the control register 23, the display control unit 34 controls the display positions, the display widths, the scrolling and so on of the display screen.

The color pallet unit 35 expands the abbreviated color data in image information from the image data memory 17 into corresponding digital RGB color data, as set in the color pallet unit 35 and outputs the digital RGB data. The colors of the color pallet are set by instructions from the CPU 10.

The D/A conversion unit 36 converts the digital RGB data coming from the color pallet unit 35 into analog RGB signals suitable for displaying an image on the display 19.

In accordance with the settings of the control register 23 and the input clocks, the synchronous control unit 37 generates the various clocks necessary for the system, and generates and outputs video synchronizing signals.

The vehicular navigation display system of the present invention has following special features compared to a conventional 320 dot display system.

(1) The control register 23 of the display operation control unit 21 is additionally given a register function to select clocks.

(2) The image data memory access control unit 25 of the image data memory control unit 24 is additionally given a function to process the 400-dot data at the reading time for the displaying operation. The switching between the 320-dot and 400-dot control is executed in accordance with the clock select signals. For the control of 400-dots, the image data memory access unit 25 outputs the control signals to other blocks of the image data memory control unit 24 so that the read data number is for 400-dot data for the displaying operation.

The image data memory access control unit 25 reads the image data memory in accordance with the dot number to be displayed and changes the data number to be written in the line buffer. For example if forty data segments (for image information of eight dots per data segment) at a time for a display of 320 dots per line, are read out from the image data memory and written in the line buffer, fifty data segments are read out, at a time for a display of 400 dots per line, from the image data memory and written in the line buffer. Thus the number of the data segments to be read out per line is changed in response to the clock select signals.

For the control of 400 dots, the LB write control unit 26 is enhanced to write the image data of 400 dots in the line buffer 30.

For the control of 400 dots, the LB write address generation unit 29 has its function so enhanced as to generate the address for writing the data of 400 dots in the line buffer 30.

(3) The line buffer 30 has its capacity increased to receive image data of 400 dots.

(4) The LB read control unit 32 of the display unit 31 is enhanced to read the image data of 400 dots.

(5) The LB read address generation unit 33 is enhanced to output the addresses of the line buffer data of 400 dots.

(6) The display control unit 34 is set by the control register 23 to control the display screen (controlling the display position, the display width, the scrolling and so on) for 400 dots.

(7) The synchronous control unit 37 is additionally given a function to switch the clock (CLK1) for 320 dots and the clock (CLK2) for 400 dots in accordance with the clock select signals. Considering the operating state, the clocks are switched at a time (e.g., during a vertical synchronizing period) when no influence is exerted upon the system so that there is no delay.

Figure 3:
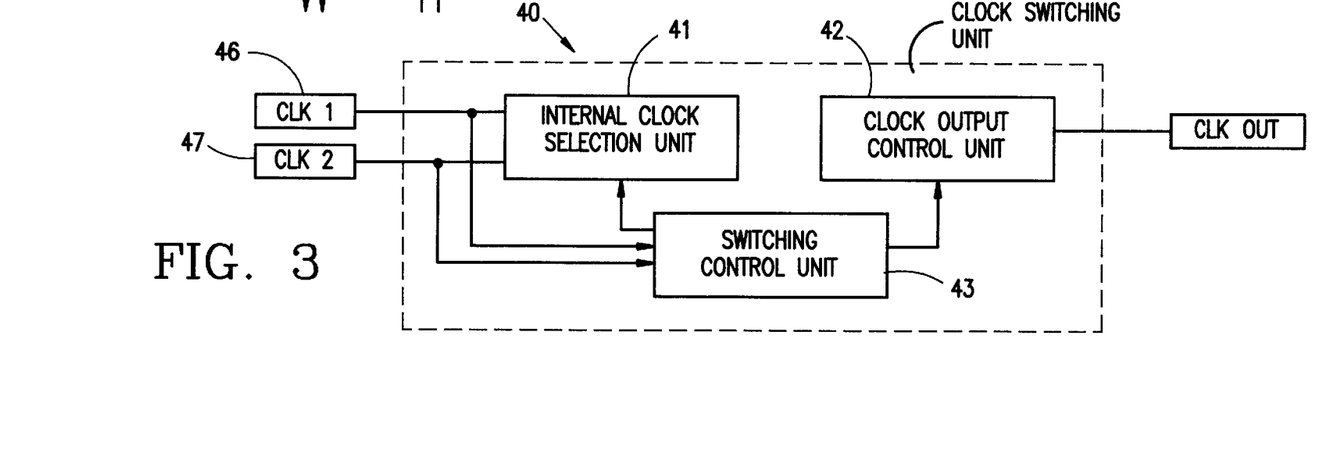
FIG. 3 is a block diagram of a clock switching unit in the ASIC of FIG. 1.

In the block diagram of FIG. 3, a clock switching unit 40 includes an internal clock select unit 41, a clock output control unit 42 and a switching control unit 43.

Figure 4:
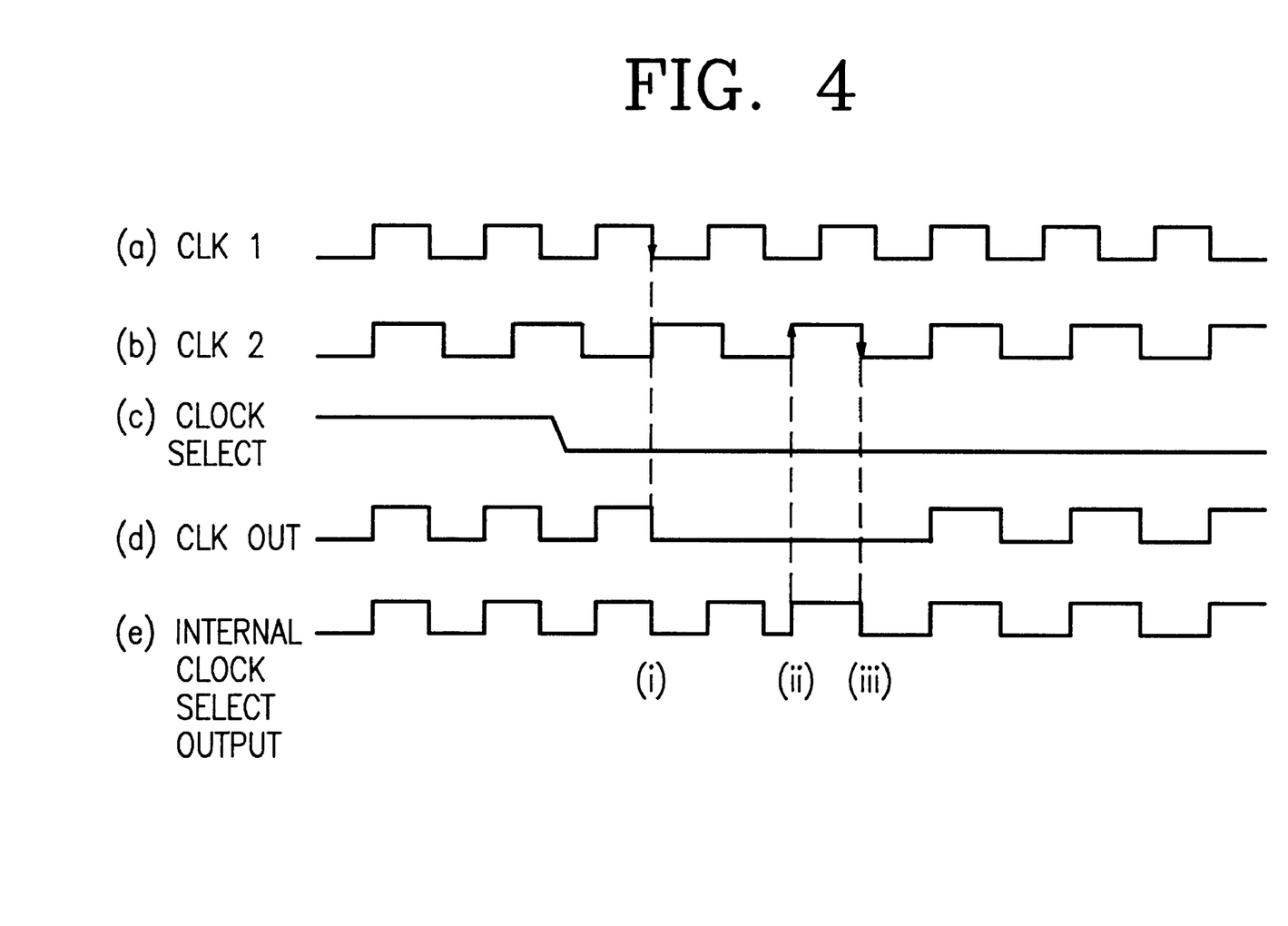
FIG. 4 is a timing chart of waveforms associated with a clock switching operation in the ASIC of FIG. 1.

In FIG. 4: (a) illustrates the clock signal CLK1; (b) illustrates the clock signal CLK2; (c) illustrates the clock select signal; (d) illustrates the output signal CLK OUT; and (e) illustrates the internal clock select output signal. A high clock select signal (c) selects clock CLK1 while a low clock select signal (c) selects the clock CLK2. During a switching operation as shown at (i), the CLK OUT signal is fixed low; at (ii), the internal clock select switching is effected; and at (iii), the internal select unit output signal (e) is again output as the CLK OUT.

Figure 5:
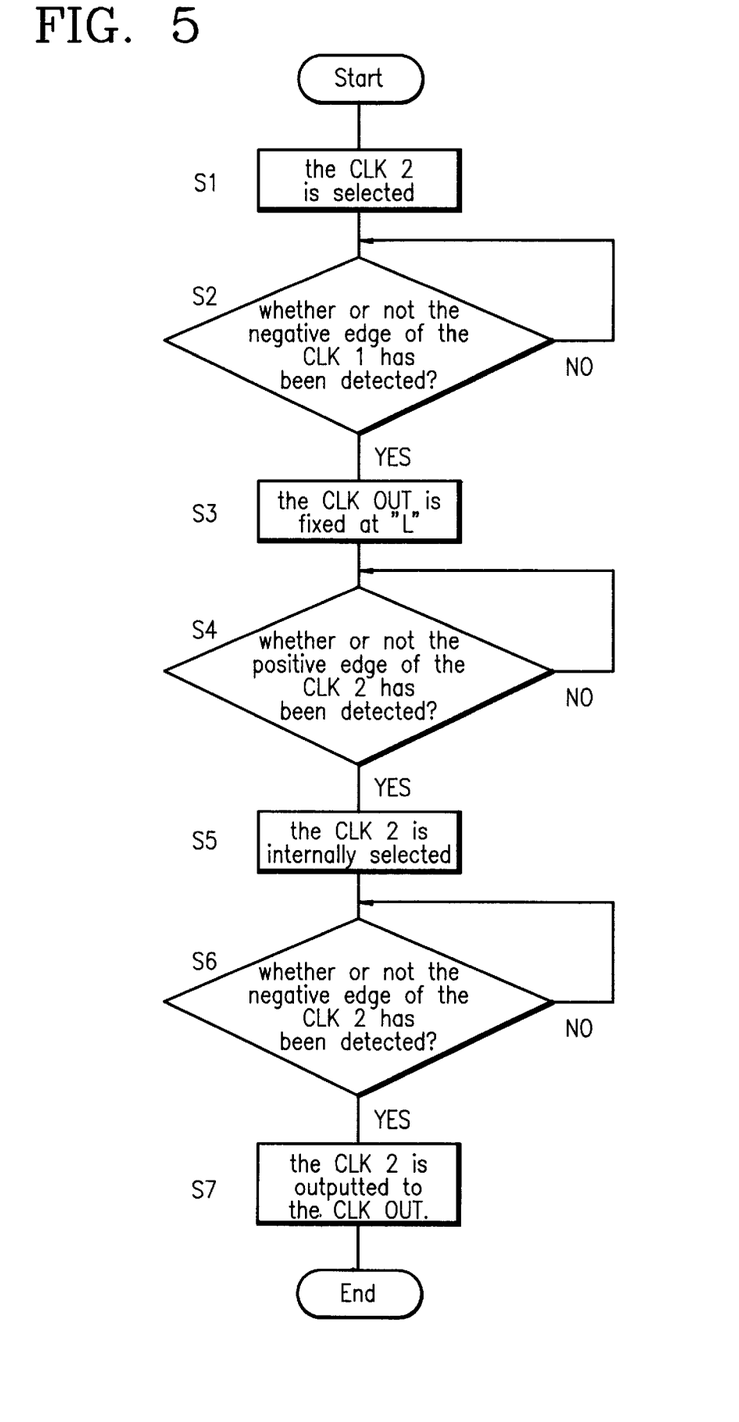
FIG. 5, is a flow chart of the clock switching procedure of the vehicular navigation system of FIG. 2.

This clock switching flow is described with reference to FIG. 5 for an example of switching from the clock CLK1 to the clock CLK2.

(1) First of all, switch to the clock CLK2 is selected in step S1.

(2) Next in step S2, it is checked whether or not the negative edge (or fall) of the CLK1 has been detected.

(3) If the answer of step S2 is YES, the CLK OUT is fixed low in step S3 as shown at (i) in FIG. 4.

(4) Next in step S4, it is checked whether or not the positive edge (or rise) of the clock CLK2 has been detected.

(5) If the answer of step S4 is YES, the CLK2 is internally selected in step S5 as shown at (ii) in FIG. 4.

(6) Next in step S6, it is checked whether or not the negative edge of the clock CLK2 has been detected.

(7) If the answer of step S6 is YES, the holding of CLK OUT low is terminated, and the CLK2, as selected by the internal clock select unit, is output in step S7 as shown at (iii) in FIG. 4.

Operation of the vehicular navigation system of the present invention when CLK1 or 320 dots per horizontal line is selected is similar to that described above in connection with the prior art.

Figure 6:
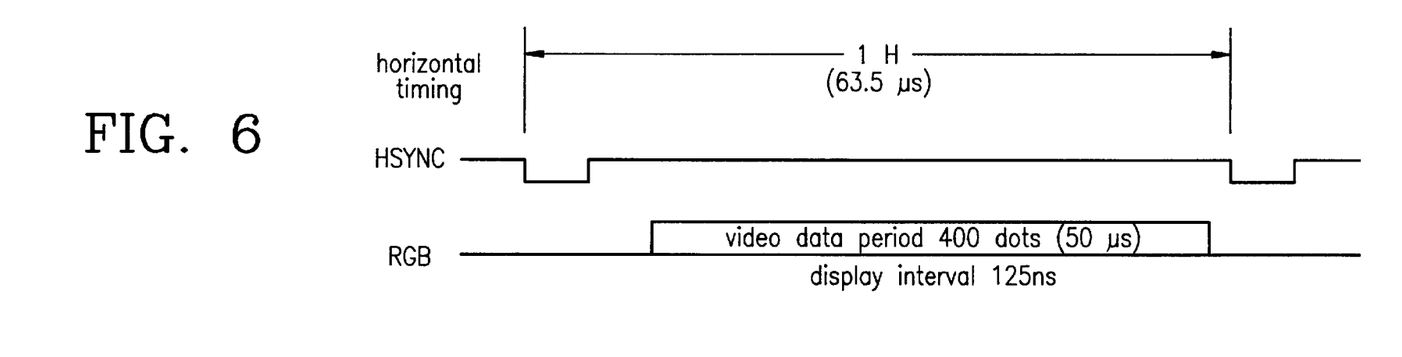
FIG. 6 is a timing chart of horizontal sync and video signals generated by the ASIC of FIG. 1 to operate a 400 dot per horizontal line display.

When CLK2 or 400 dots per horizontal line is selected, operation is as follows:

As illustrated in FIG. 6, a horizontal synchronizing signal HSYNC has a period of 63.5 $\mu$s, and the video portion of each horizontal line has 400 dots or pixels over a period of 50 $\mu$s. In this example, each pixel has a period of 125 ns so that the pixels are output at a frequency of 8 MHz. Thus the clock CLK2 input to ASIC is at a frequency of 32 MHz.

The CPU plots the data of an image to be displayed, in the image data memory 17 through the system bus 11 and the ASIC 16.

After this, the color pallet unit 35 and the control register 23 of the ASIC 16 are set to start the display in the ASIC 16. At this time, the clock selection control register 23 is set to select CLK2, if CLK1 was previously selected.

The clock switching function in the synchronous control unit 37 is switched from the CLK1 to the CLK2 in response to the clock select signal.

The image data memory access control unit 25 of the ASIC 16 outputs the request signal for accessing the image data memory 17 to the CPU 10, and outputs the read instructions to the image data memory control signal generation unit 27 and the image data memory address generation unit 28 when it receives the acknowledge signal from the CPU 10. Simultaneously with this, in order that the read data may be written in the line buffer 30, the write instruction is output to the LB write control unit 26 and the LB write address generation unit 29. Then, the data of one line (400 dots) of the image data memory 17 are transferred at high speed into the line buffer 30.

In accordance with the signal from the control register 23, the display unit 31 reads the data, as written in the line buffer 30, under control by the LB read control unit 32 and the LB read address generation unit 33, and transfers the data to the display control unit 34. This display control unit 34 processes or scrolls the data and transfers them to the color pallet unit 35. This color pallet unit 35 expands the data in the color pallet and outputs the digital RGB data. The digital RGB data are converted by the D/A conversion unit 36 into analog RGB signals and output to the display.

These operations in the ASIC 16 are controlled by the various synchronizing signals and clocks, as prepared from the CLK2 selected by the clock switching function of the synchronous control unit 37. Especially, the output frequency of the data from the color pallet unit 35 and the conversion frequency of the D/A unit 36 are equal to that of the pixel frequency in the RGB video signals to the 400 dot per horizontal line display 19.

The synchronous control unit 37 outputs the video synchronizing signals to the video signal interface 18.

The video signal interface 18 converts the analog RGB data output into suitable signals for input to the 400-dot display 19. The CLK2 for 400 dots uses 32 MHz in this embodiment.

Figure 9:
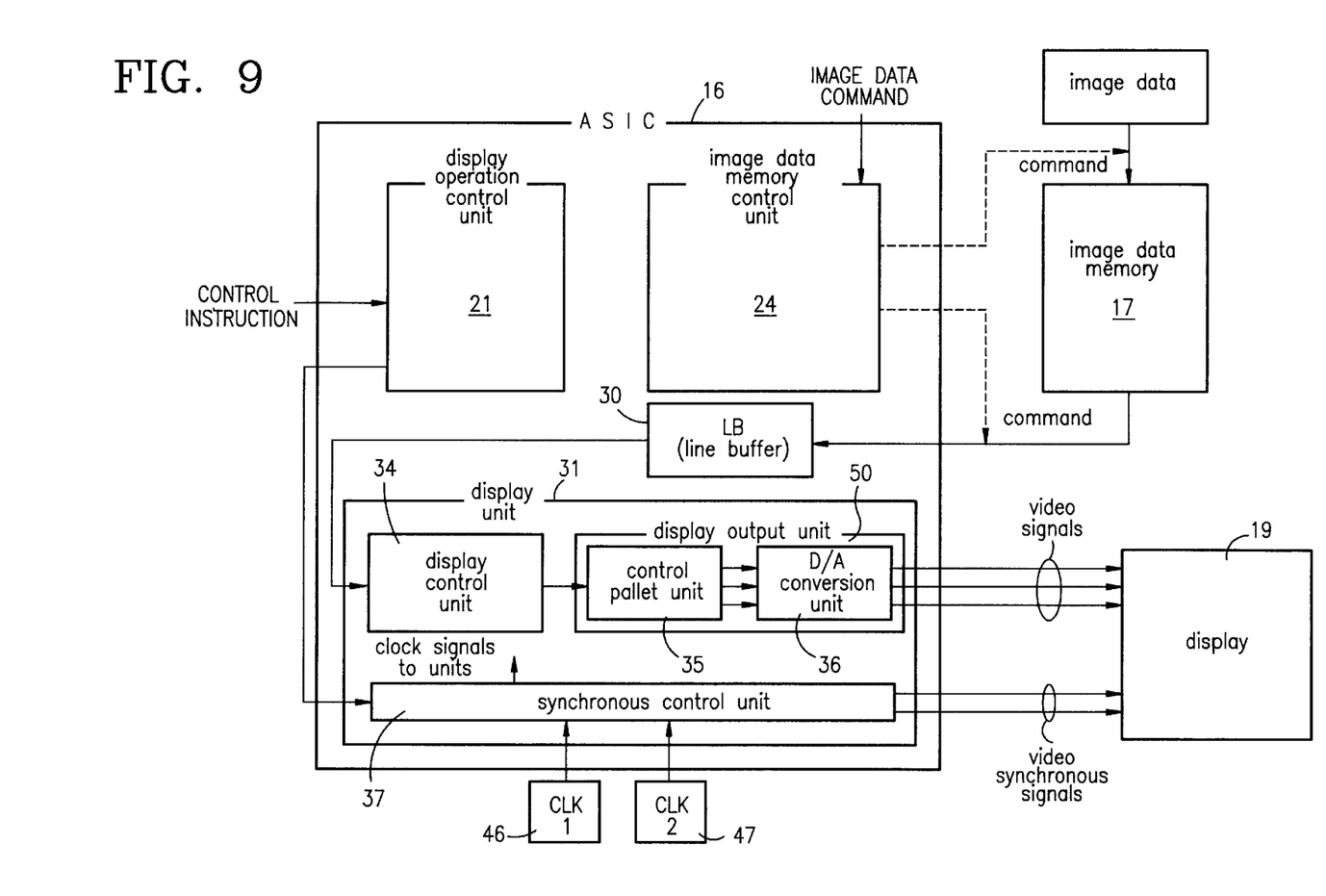
FIG. 9 is a block diagram of a variation of the application-specified IC (ASIC) of a vehicular navigation system in accordance with the invention.

In the variation shown in FIG. 9, parts are identified by numerals used to identify similar parts in the system of FIG. 1. The display operation control unit 21 receives a control instruction from the CPU to control the selection of the number of dots per horizontal line on the display 19. In response to the control instruction, the display operation control unit 21, in turn, controls the synchronous control unit 37 to select either the clock CLK1 or the clock CLK2 generating appropriate clock signals for the units in the ASIC 16 as well as horizontal and vertical sync signals for the display 19. The image data memory control unit 24, in response to an image data command from the CPU controls the writing of image data in the image data memory 17. This image data memory control unit 24 subsequently controls the reading of image data from the image data memory 17 and writing of the image data into the line buffer 30 in accordance with the dot number selected by the display operation control unit 21. The line buffer 30 receives and temporary stores the image data for each horizontal line read out from the image data memory 17. A display control unit 34, responsive to the image data from the line buffer, controls the display screen in accordance with the number of dots. A display output unit 50 converts the image dot data received from the line buffer 30 into video signals of the image being displayed on the display 19. In the display output unit 50, the color pallet unit 35 converts the digital data for each horizontal dot into corresponding digital RGB data which in turn is converted to the analog RGB video signals.

In the above-described embodiments, the display of 320 dots and 400 dots per horizontal line has been described. The display of other dot numbers can likewise be performed by switching clocks according to the dot numbers of the display.

For an increased number of displays in the future, a common ECU can be manufactured for three kinds or more of displays wherein the clock frequency and horizontal line dot number are selected to control the image data to be handled in the ASIC in accordance with the displays.

For the wider navigation system display of 400 dots mounted in a vehicle, the wider screen can display a map covering a wider range than that of the 320-dot screen of the prior art to provide road situations of wider ranges.

There can also be utilized a variety of enhanced display modes such as dividing the wide screen into two frames, one of which displays a map to guide a route and the other of which displays the information on facilities or traffic in the region covered by the map, information of the audio system or a TV screen.

Additionally, the letters of place names, as written in the menu screen or the map, can be easily read to facilitate the input operation.

The present invention is not limited to the foregoing embodiment which can be modified in various manners without departing from the scope and spirit of the invention. Thus modifications should not be excluded from the scope of the invention.

What is claimed is:

1. A vehicular navigation system comprising:
    (a) at least two clocks corresponding to different horizontal dot numbers of respective displays which can be connected with the system;
    (b) a display operation control unit for selecting one of said clocks in accordance with a selected horizontal line dot number of a selected display;
    (c) a synchronous control unit responsive to the display operation control unit for switching to the clock corresponding to the selected horizontal dot number;
    (d) an image data memory;
    (e) a line buffer;
    (f) an image data memory control unit for writing image data in said image data memory in response to an instruction from a CPU and for reading the image data from said image data memory and writing the read image data in said line buffer in accordance with the selected horizontal dot number and the switched clock;
    (g) a display control unit for receiving image data read from the line buffer; and
    (h) a display output unit for producing corresponding video signals from the image data received by the display control unit to apply to the selected display.

2. A vehicular navigation system according to claim 1, wherein the two different horizontal line dot numbers include (a) a horizontal line dot number of 320 dots corresponding to a display aspect ratio of 4:3 and (b) a horizontal line dot number of 400 dots corresponding to a display aspect ratio of 16:9.

3. A vehicular navigation system according to claim 1 wherein said display operation control unit includes a control register which is operated by an instruction from the CPU to select the horizontal dot number and control the synchronous control unit, the image data memory control unit, and the display control unit.

4. A vehicular navigation system according to claim 1 wherein said line buffer has a capacity to receive image data of a horizontal line of dots corresponding to the largest dot number of the different horizontal dot numbers.

* * * * *